(12) United States Patent
Moradnia et al.

(10) Patent No.: US 11,642,933 B2
(45) Date of Patent: May 9, 2023

(54) HEAT TRANSFER SYSTEM FOR A VEHICLE

(71) Applicant: Honda Motor Co., Ltd., Tokyo (JP)

(72) Inventors: Pirooz Moradnia, Dublin, OH (US);
Daniel A. Favela Tentori, Columbus, OH (US); David Wayne Halt, Marysville, OH (US); Matthew L. Metka, Plain City, OH (US); Pratap Thamanna Rao, Columbus, OH (US); Brian R. Reynolds, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 16/910,680

(22) Filed: Jun. 24, 2020

(65) Prior Publication Data

US 2021/0402843 A1 Dec. 30, 2021

(51) Int. Cl.
*B60H 1/00* (2006.01)
*F01P 7/00* (2006.01)
(Continued)

(52) U.S. Cl.
CPC ........... *B60H 1/00278* (2013.01); *B60H 1/00* (2013.01); *B60H 1/00328* (2013.01);
(Continued)

(58) Field of Classification Search
CPC .. B60H 1/00278; B60H 1/00; B60H 1/00328; B60H 1/00392; B60H 2001/003;
(Continued)

(56) References Cited

U.S. PATENT DOCUMENTS 1,452,958 A * 4/1923 Curran ................... B64D 33/10
165/44
2,117,632 A * 5/1938 Sikorsky ................ B64D 33/10
123/41.1
(Continued)

FOREIGN PATENT DOCUMENTS

DE 2931812 A1 2/1981
DE 102004010632 A1 10/2005
(Continued)

OTHER PUBLICATIONS

Espacenet Machine Translation of DE Patent No. 102016120459 A1.
(Continued)

*Primary Examiner* — Ljiljana V. Ciric
(74) *Attorney, Agent, or Firm* — Plumsea Law Group, LLC

(57) ABSTRACT

A vehicle heat transfer system includes a flow through heat exchanger, a surface heat exchanger, at least a first vehicle component, and a controller that is operable to selectively transfer heat to or from the first vehicle component with either or both of the flow through heat exchanger and the surface heat exchanger based on one or more operating conditions. In a further aspect, a vehicle heat transfer system includes, a vehicle component positioned on a vehicle that is heated or cooled by a fluid, and a surface heat exchanger positioned on the vehicle, the surface heat exchanger having an inlet that receives the fluid used to heat or cool the vehicle component, an outlet that returns the fluid to heat or cool the vehicle component, and a closed fluid path extending between the inlet and the outlet.

8 Claims, 14 Drawing Sheets

(51) Int. Cl.
  *F01P 3/18* (2006.01)
  *B60K 11/04* (2006.01)
  *B60K 11/08* (2006.01)
  *F01P 7/10* (2006.01)
(52) U.S. Cl.
  CPC .......... *B60H 1/00392* (2013.01); *B60K 11/04* (2013.01); *B60K 11/085* (2013.01); *F01P 3/18* (2013.01); *F01P 7/00* (2013.01); *B60H 2001/003* (2013.01); *B60H 2001/0035* (2013.01); *B60H 2001/00307* (2013.01); *F01P 7/10* (2013.01); *F01P 2003/182* (2013.01)
(58) Field of Classification Search
  CPC .. B60H 2001/00307; B60H 2001/0035; B60K 11/04; B60K 11/085; F01P 3/18; F01P 7/00; F01P 7/10; F01P 2003/182; Y02T 10/88
  See application file for complete search history.

(56) References Cited

U.S. PATENT DOCUMENTS

| | | | | |
|---|---|---|---|---|
| 2,133,514 A * | 10/1938 | Holmes | F01P 7/10 | 165/44 |
| 2,134,724 A * | 11/1938 | McClanahan | B60H 1/247 | 454/165 |
| 2,168,166 A * | 8/1939 | Larrecq | B64D 33/10 | 165/44 |
| 2,216,111 A * | 10/1940 | Huet | B60K 11/06 | 165/44 |
| 2,249,948 A * | 7/1941 | Dornier | B64D 33/12 | 165/44 |
| 2,682,852 A * | 7/1954 | Ruffolo | F28D 1/022 | 165/44 |
| 3,367,410 A * | 2/1968 | Kendrick, Jr. | F01P 9/00 | 165/47 |
| 3,620,297 A * | 11/1971 | Orville | B60H 1/3202 | 165/44 |
| 3,977,206 A * | 8/1976 | Simmons | F28D 15/06 | 165/44 |
| 4,076,072 A * | 2/1978 | Bentz | F28G 9/00 | 165/41 |
| 4,345,641 A * | 8/1982 | Hauser | B60K 11/04 | 165/41 |
| 4,414,462 A * | 11/1983 | Price | B61D 5/02 | 165/104.31 |
| 4,482,114 A * | 11/1984 | Gupta | B64D 15/02 | 244/134 B |
| 4,605,184 A * | 8/1986 | Kim | B64G 1/58 | 165/44 |
| 4,635,709 A * | 1/1987 | Altoz | H05K 7/20254 | 165/44 |
| 4,674,704 A * | 6/1987 | Altoz | H05K 7/20136 | 244/1 R |
| 4,706,461 A * | 11/1987 | Pratt | F28F 27/02 | 165/44 |
| 4,924,826 A * | 5/1990 | Vinson | F01P 7/12 | 123/195 C |
| 5,046,554 A * | 9/1991 | Iwasaki | B60K 11/04 | 165/44 |
| 5,117,898 A * | 6/1992 | Light | F01P 7/085 | 165/41 |
| 5,476,138 A * | 12/1995 | Iwasaki | F28D 1/0435 | 165/41 |
| 5,490,572 A * | 2/1996 | Tajiri | B60L 1/02 | 180/68.5 |
| 5,507,673 A * | 4/1996 | Boggia | B63H 11/08 | 440/46 |
| 5,544,487 A * | 8/1996 | Attey | F25B 21/02 | 165/170 |
| 5,653,111 A * | 8/1997 | Attey | F04D 13/0673 | 165/170 |
| 5,927,384 A * | 7/1999 | Waldner, Jr. | F16H 57/0415 | 165/47 |
| 5,947,189 A * | 9/1999 | Takeuchi | F04D 25/06 | 123/41.31 |
| 6,189,608 B1 * | 2/2001 | Bodas | B60K 11/085 | 165/300 |
| 6,364,004 B1 * | 4/2002 | Ehrmann | H02K 11/33 | 123/41.31 |
| 6,397,927 B1 * | 6/2002 | Sterner | G06F 1/203 | 361/679.55 |
| 6,443,253 B1 * | 9/2002 | Whitehead | H01M 50/20 | 165/41 |
| 6,467,538 B1 * | 10/2002 | Acre | B60H 1/02 | 165/44 |
| 6,505,696 B1 | 1/2003 | Prevost | | |
| 6,544,085 B1 * | 4/2003 | Menard | B63H 21/10 | 165/44 |
| 6,688,383 B1 * | 2/2004 | Sommer | F28F 3/12 | 165/200 |
| 6,701,733 B2 * | 3/2004 | Brunner | B63J 3/02 | 165/44 |
| 7,143,605 B2 * | 12/2006 | Rohrer | F25B 5/02 | 62/515 |
| 7,255,189 B2 * | 8/2007 | Kurtz, Jr. | B60K 11/04 | 123/41.43 |
| 7,398,745 B1 * | 7/2008 | White | F01P 7/16 | 165/41 |
| 7,401,672 B2 * | 7/2008 | Kurtz, Jr. | B60K 11/04 | 180/69.2 |
| 7,520,465 B2 * | 4/2009 | Mahjoub | B64D 33/10 | 165/44 |
| 7,581,582 B2 * | 9/2009 | Longdill | F01N 3/28 | 165/41 |
| 7,828,050 B2 * | 11/2010 | Esaki | B60N 2/5825 | 165/41 |
| 7,918,193 B2 * | 4/2011 | Kojima | F01P 5/04 | 123/41.11 |
| 8,173,286 B2 * | 5/2012 | Marukawa | H01M 50/204 | 429/82 |
| 8,347,830 B2 * | 1/2013 | Tregnago | B60K 11/00 | 123/41.58 |
| 8,376,029 B2 * | 2/2013 | Rericha | F28D 1/022 | 165/44 |
| 8,408,281 B2 * | 4/2013 | Hamstra | B64D 13/00 | 165/44 |
| 8,424,589 B2 * | 4/2013 | McMillan | F28D 1/024 | 165/41 |
| 8,544,583 B2 * | 10/2013 | Ajisaka | B62D 35/02 | 180/68.1 |
| 8,571,749 B2 * | 10/2013 | Kawato | B60K 11/085 | 701/29.2 |
| 8,602,091 B2 * | 12/2013 | Nemoto | B60L 1/003 | 165/44 |
| 8,646,552 B2 * | 2/2014 | Evans | B60R 19/12 | 180/68.1 |
| 8,668,254 B2 * | 3/2014 | Onodera | B62D 35/02 | 180/69.1 |
| 8,672,073 B2 * | 3/2014 | Ueda | E02F 9/0866 | 180/68.1 |
| 8,708,075 B2 * | 4/2014 | Maurer | B60K 11/08 | 180/68.1 |
| 8,892,314 B2 * | 11/2014 | Charnesky | F01P 7/04 | 180/68.1 |
| 8,936,122 B2 * | 1/2015 | MacGregor | B60K 11/04 | 180/68.1 |
| 8,944,145 B2 * | 2/2015 | Esaki | B60H 1/00285 | 165/41 |
| 8,967,307 B2 * | 3/2015 | Kim | F01P 5/02 | 180/68.1 |
| 9,045,028 B2 * | 6/2015 | Ichikawa | B60L 1/08 | |
| 9,242,528 B2 * | 1/2016 | Graaf | B60H 1/00064 | |
| 9,365,091 B2 * | 6/2016 | Pekarsky | H01M 10/625 | |
| 9,389,007 B1 * | 7/2016 | McKay | F25B 47/025 | |
| 9,459,051 B2 * | 10/2016 | Clarke | F28D 1/04 | |
| 9,611,778 B2 * | 4/2017 | Nam | F02B 29/0468 | |
| 9,682,608 B2 * | 6/2017 | Goenka | B60H 1/32281 | |

(56) References Cited

U.S. PATENT DOCUMENTS

| | | |
|---|---|---|
| 9,694,858 B2 * | 7/2017 | Wolf .................... B62D 37/02 |
| 9,776,499 B2 | 10/2017 | Nam et al. |
| 9,926,022 B1 | 3/2018 | Golembeski et al. |
| 10,005,337 B2 * | 6/2018 | Petrovski ............. B60N 2/5635 |
| 10,150,552 B2 * | 12/2018 | Grimm, III ............... B62B 9/22 |
| 10,161,101 B2 * | 12/2018 | Nishiguchi ............ B60K 11/04 |
| 10,166,859 B1 * | 1/2019 | Del Gaizo ............. B62D 37/02 |
| 10,211,493 B2 * | 2/2019 | Janarthanam ....... H01M 10/613 |
| 10,252,611 B2 * | 4/2019 | Errick ................. B60K 11/085 |
| 10,259,291 B2 * | 4/2019 | Aldridge ................ B60H 1/323 |
| 10,363,810 B2 * | 7/2019 | Blackford ............. B60K 11/06 |
| 10,377,432 B2 * | 8/2019 | Ayukawa ............. B62D 21/11 |
| 10,393,005 B2 * | 8/2019 | Charnesky ............. F01P 7/165 |
| 10,470,343 B2 * | 11/2019 | Shibata ............. H05K 7/20909 |
| 10,476,051 B2 * | 11/2019 | Mardall ............. H01M 10/658 |
| 10,487,476 B2 * | 11/2019 | Kumagai ............. E02F 9/0866 |
| 10,562,389 B2 * | 2/2020 | Vacca ................. B60K 11/085 |
| 10,647,194 B1 * | 5/2020 | Burtch ................. B60K 11/085 |
| 10,770,317 B2 * | 9/2020 | Tustaniwskyj ..... H05K 7/20272 |
| 10,787,141 B2 * | 9/2020 | Vacca ................. B60R 19/52 |
| 10,813,286 B2 * | 10/2020 | Woytera ................... F01P 11/10 |
| 10,882,378 B2 * | 1/2021 | Jiang .................. B60H 1/00521 |
| 11,040,600 B2 * | 6/2021 | Huenemoerder .. B60H 1/00392 |
| 11,091,026 B2 * | 8/2021 | Mussack ............. B60K 11/06 |
| 11,110,984 B1 * | 9/2021 | McKinney ............... B62J 33/00 |
| 11,225,900 B2 * | 1/2022 | Jeong ................. B60K 11/085 |
| 11,326,506 B2 * | 5/2022 | Cremering ............. F01P 11/10 |
| 11,498,413 B2 * | 11/2022 | Henon .................. B60K 11/08 |
| 2004/0194912 A1 | 10/2004 | Honda |
| 2008/0185121 A1 * | 8/2008 | Clarke .................. B62K 11/04 165/44 |
| 2008/0250804 A1 * | 10/2008 | Kubo ...................... F28D 7/106 165/44 |
| 2009/0078394 A1 * | 3/2009 | Weatherup ............. B60K 11/04 165/47 |
| 2009/0223757 A1 * | 9/2009 | Ballard ................ F16D 65/847 165/44 |
| 2009/0277428 A1 * | 11/2009 | Marsh ................ F02B 29/0425 165/44 |
| 2009/0277429 A1 * | 11/2009 | Marsh .................... F02M 26/19 165/44 |
| 2009/0277601 A1 * | 11/2009 | Al-Shawaf ............ F28D 1/0452 165/44 |
| 2010/0044005 A1 * | 2/2010 | Bruno ................ H05K 7/20872 165/44 |
| 2010/0200195 A1 * | 8/2010 | Himmelsbach .... B60H 1/00328 165/51 |
| 2012/0049664 A1 * | 3/2012 | Yokoyama ............. B60H 1/143 165/41 |
| 2012/0222833 A1 * | 9/2012 | Vikstrom ................ F28F 27/02 165/41 |
| 2013/0059519 A1 * | 3/2013 | Tajima ................... B60K 11/04 454/152 |
| 2018/0163607 A1 | 6/2018 | Uto et al. |
| 2019/0145719 A1 * | 5/2019 | Meskin .................... F28F 9/001 165/67 |
| 2019/0363411 A1 * | 11/2019 | Takeuchi .......... H01M 10/6552 |
| 2020/0101817 A1 * | 4/2020 | Ohlhoff ................. F28F 19/002 |
| 2020/0398634 A1 * | 12/2020 | Cheadle .................. F24H 1/009 |
| 2021/0051821 A1 * | 2/2021 | Holleczek ............... G01S 17/86 |
| 2021/0070131 A1 * | 3/2021 | Weston ............. B60H 1/00042 |
| 2021/0402843 A1 * | 12/2021 | Moradnia .......... B60H 1/00328 |
| 2021/0402869 A1 * | 12/2021 | Favela Tentori .......... B60L 1/02 |
| 2021/0402870 A1 * | 12/2021 | Moradnia ............. B62D 25/085 |
| 2022/0297530 A1 * | 9/2022 | Moradnia ............. B60K 11/02 |

FOREIGN PATENT DOCUMENTS

| | | |
|---|---|---|
| DE | 102004019769 A1 | 11/2005 |
| DE | 102015103393 A1 | 9/2016 |
| DE | 102016120459 A1 | 4/2018 |
| DE | 102017200624 A1 | 7/2018 |
| JP | 2005126029 A | 5/2005 |
| JP | 2010274675 A | 12/2010 |
| JP | 6002000 B2 | 10/2016 |

OTHER PUBLICATIONS

Espacenet Machine Translation of DE Patent No. 102015103393 A1.
Espacenet Machine Translation of DE Patent No. 102004010632 A1.
Espacenet Machine Translation of JP Patent No. 6002000 B2.

* cited by examiner

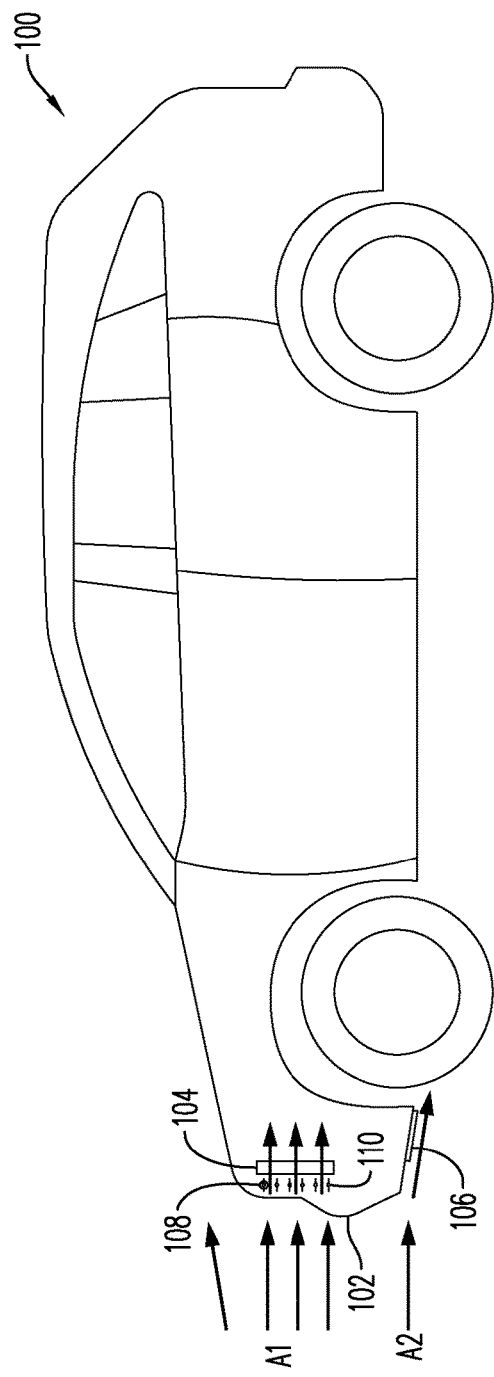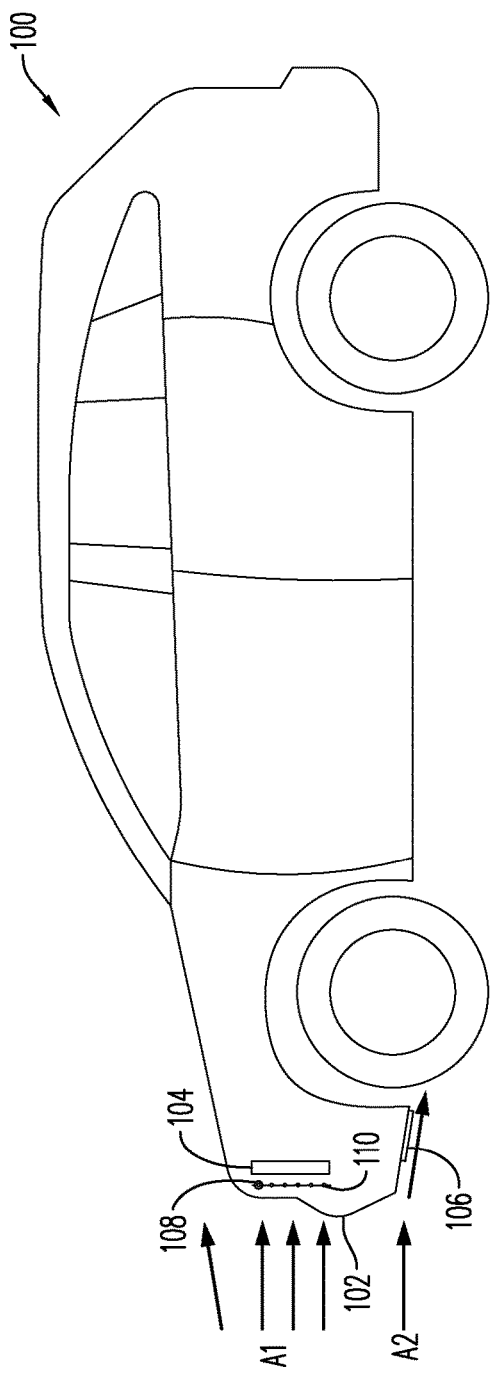

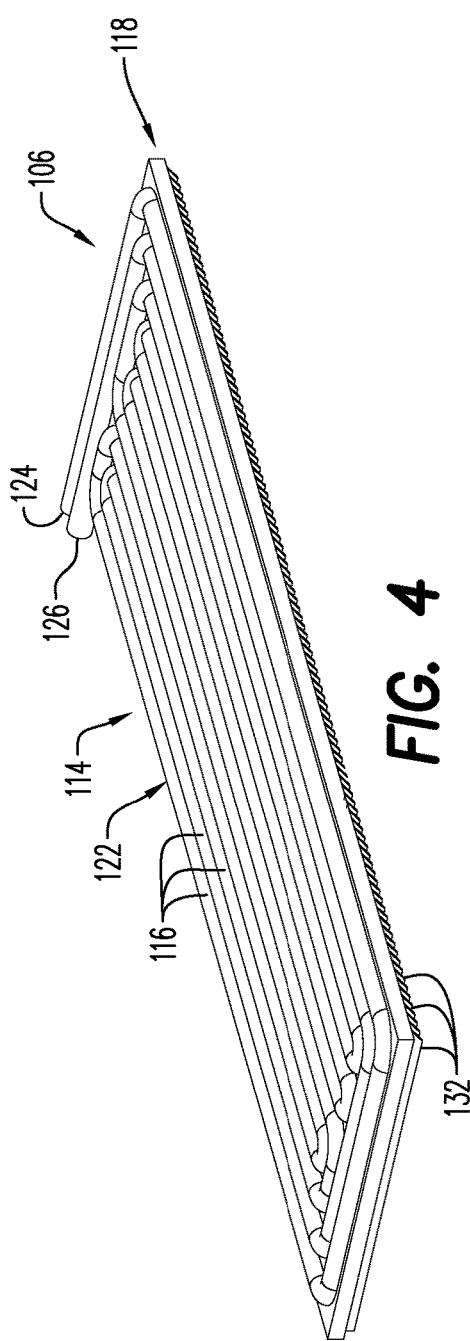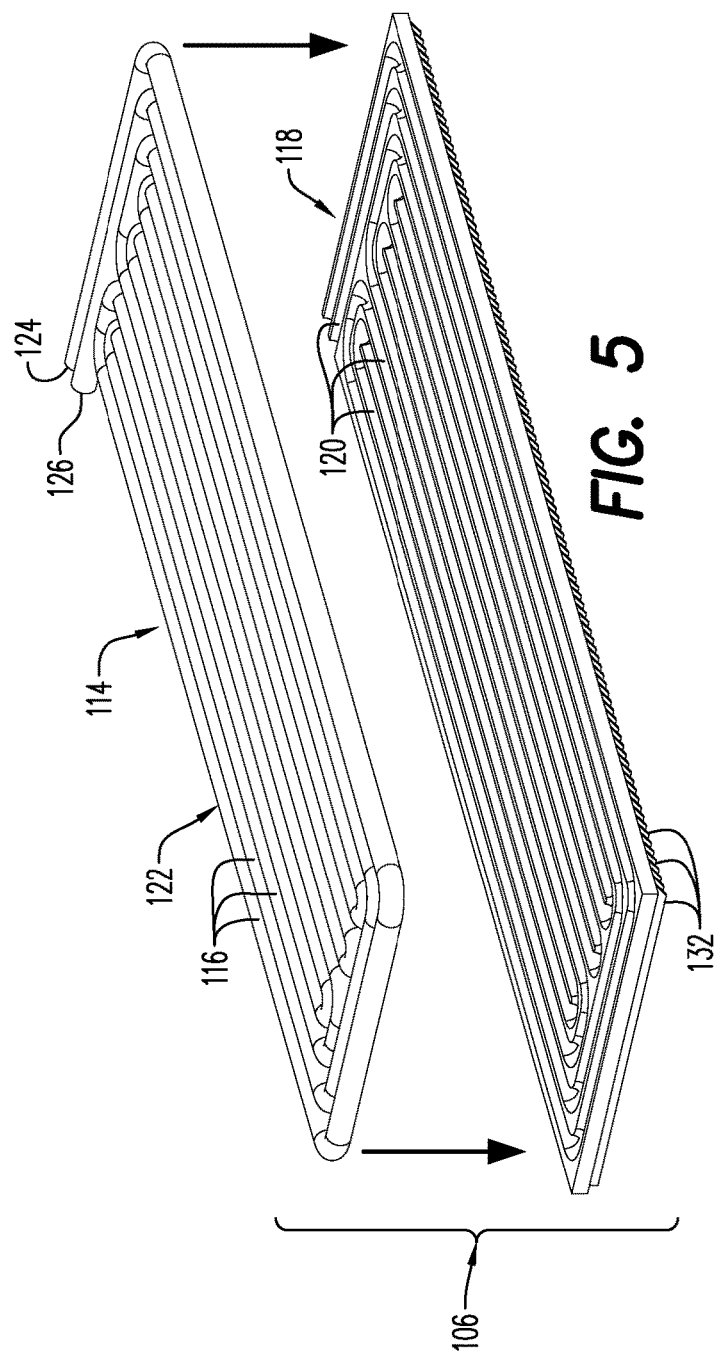

HEAT TRANSFER SYSTEM FOR A VEHICLE

BACKGROUND

1. Field of the Disclosure

The present disclosure relates to a heat transfer system for heating or cooling vehicle components, and more particularly, to a heat transfer system including more than one type of heat exchanger.

2. Description of Related Art

In a vehicle, such as an electric vehicle, with a conventionally disposed heat exchanger in the front end structure, i.e., under the hood, ambient air generally flows through a front vehicle grille and then through the heat exchanger. The heat exchanger transfers heat from the hot coolant that flows in the heat exchanger tubes to the cooler ambient air blowing through it, thereby providing heat transfer for cooling selected components of the vehicle. While effective for cooling purposes, cross airflow through the heat exchanger creates an aerodynamic drag that can diminish the overall performance of the vehicle. Active grille shutters can be used to regulate the airflow to the heat exchanger to reduce aerodynamic drag and improve fuel economy. Airflow through the heat exchanger is decreased when the active grille shutters are closed and thus the cooling ability of the cooling system is reduced.

SUMMARY

The disclosure herein provides a heat transfer system for a vehicle, and in a non-limiting example, for an electric vehicle. Electric vehicles utilize systems including batteries, chargers, and other components that do not operate as efficiently if the temperature of the component is not within a specific predetermined range. While a conventional cross airflow heat exchanger is effective for cooling purposes, the flow of ambient air through the heat exchanger creates an aerodynamic drag that can diminish the overall performance of the vehicle. Hence, in order to obtain improved aerodynamic performance and vehicle efficiency, an exemplary embodiment of the disclosure provides a surface heat exchanger, which may be disposed on an underbody or underside of the vehicle.

In one aspect, the disclosure provides a vehicle heat transfer system including a flow through heat exchanger, a surface heat exchanger, at least a first vehicle component, and a controller that is operable in at least a first mode to selectively exchange heat to or from at least the first vehicle component with either or both of the flow through heat exchanger and the surface heat exchanger based on one or more operating conditions.

In a further aspect of the disclosure, a vehicle heat transfer system includes a vehicle component positioned on a vehicle that is heated or cooled by a fluid; and a surface heat exchanger having an inlet that receives the fluid used to heat or cool the vehicle component, an outlet that returns the fluid to heat or cool the vehicle component, and a closed fluid path extending between the inlet and the outlet.

In another aspect, the disclosure provides a method of transferring heat in a vehicle with a heat transfer system including a surface heat exchanger, a flow through heat exchanger that has a different aerodynamic performance than the surface heat exchanger, and a vehicle component; measuring an operating condition affecting the heat transfer system; and controlling the operation of the surface heat exchanger and the flow through heat exchanger based on the operating condition to transfer heat to or from the vehicle component.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 1A is a schematic view of a heat transfer system in a first mode of operation according to an exemplary embodiment of the disclosure.

FIG. 1B is a schematic view of the heat transfer system in a second mode of operation according to an exemplary embodiment of the disclosure.

FIG. 4 is a front perspective view of the surface heat exchanger according to an exemplary embodiment of the disclosure.

FIG. 5 is an exploded view of the surface heat exchanger shown in FIG. 4.

DETAILED DESCRIPTION

Figure 2:
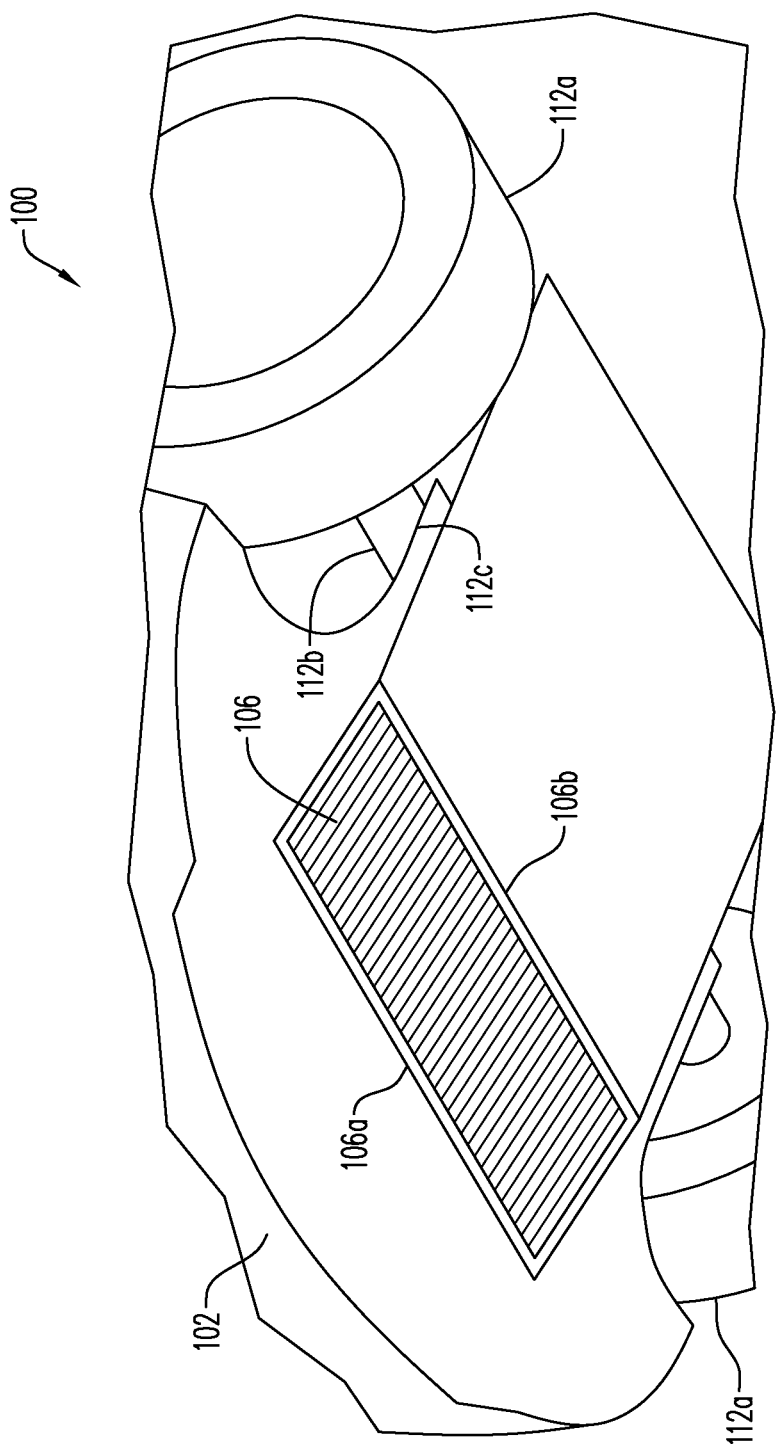
FIG. 2 is a schematic view of a surface heat exchanger positioned on a vehicle according to an exemplary embodiment of the disclosure.

An exemplary embodiment of the disclosure provides a first heat exchanger and a second, surface heat exchanger, for heat transfer from/to one or more vehicle components. Although the first heat exchanger is also referred to herein as the primary heat exchanger and the second surface heat exchanger is also referred to herein as the secondary heat exchanger, such designations are not limiting as it is to be understood that the second surface heat exchanger may operate as the primary heat exchanger for the vehicle component under certain conditions.

Under certain predetermined driving conditions, a thermal management control system may close off or obstruct airflow to the primary heat exchanger, and redirect coolant flow to utilize the surface heat exchanger to produce sufficient heat transfer, such as cooling, for the selected vehicle component. As a result, aerodynamic drag may be reduced, vehicle performance may be enhanced, and the driving range for electric vehicles may be increased. The thermal management control system also provides for utilization of both the first heat exchanger and the second surface heat exchanger under certain predetermined conditions or the use of only the first heat exchanger or only the second surface heat exchanger if conditions dictate the same.

In a non-limiting example, the surface heat exchanger may operate to transfer heat between a working fluid and airflow that is predominantly parallel to a feature of the heat exchanger outer surface. The working fluid may be part of a closed fluid path that exchanges heat with the vehicle component. The feature of the heat exchanger outer surface may be shaped, with fins or the like, to balance heat exchange efficiency with surface drag.

With reference to FIGS. 1A and 1B, a vehicle in accordance with an exemplary embodiment of the disclosure is shown generally by reference numeral 100. The vehicle 100 has a front structure 102, and a heat transfer system including a first heat exchanger or flow through heat exchanger 104, a second surface heat exchanger or surface heat exchanger 106, and a heat transfer fluid flow circuit (as discussed below). Although the first heat exchanger is also referred to as the flow through radiator or flow through heat exchanger 104, it is not limited to the functionality of a conventional flow through radiator, as it may be used for different heating or cooling purposes in one or more modes of operation. Although the second surface heat exchanger is also referred to as the surface radiator or surface heat exchanger 106, it is not limited to the functionality of a conventional radiator. For example, it is possible that in one or more modes of operation, the surface heat exchanger 106 may function as a condenser in a cooling circuit, or an evaporator in a heating circuit.

As understood by one skilled in the art, the front structure of the vehicle 102 is configured to face oncoming or incident ambient airflow A1 and A2, such as when the vehicle is in forward motion. The front structure of the vehicle 102, typically a front bumper, has openings such as a grille to allow flow to heat exchanger 104.

In the exemplary embodiment, vehicle 100 further includes an air flow control unit 108, such as grille shutters, arranged in front of the first heat exchanger 104, with regards to the forward travelling direction of the vehicle 100, to control the air flow A1 to the heat exchanger 104. With reference to FIG. 1A, the air flow control unit 108 is shown in a first manner of operation whereby the airflow control unit 108 is open and directs exterior ambient air A1 entering through front grille openings on the front of the vehicle to flow through the first or flow through heat exchanger 104 in a crossflow or substantially perpendicular manner. Although the airflow is shown as flowing through the heat exchanger 104 in a substantially perpendicular manner, it is to be understood that the air flow through the heat exchanger 104 is not limited to such a configuration. The air flow control unit 108 may also be closed in a second manner of operation to prevent the air flow A1 from reaching the first heat exchanger 104. In order to accomplish the second manner of operation, the air flow control unit 108 may include shutters or flaps 110, or any other type of known movable control valve, arranged to redirect or block the airflow A1 and prevent the airflow A1 from passing through the first heat exchanger 104, as illustrated in FIG. 1B.

With reference to FIG. 1B, the ambient air flow represented by arrows A2 passes over the second or surface heat exchanger 106, as shown disposed on the underside of the vehicle 100. Unlike the flow through heat exchanger 104 which has air flow A1 passing through the heat exchanger in a cross flow direction, i.e., substantially perpendicular to the heat exchanger, so as to create aerodynamic drag, airflow A2 merely passes over the exterior surface of surface heat exchanger 106 in a substantially parallel direction to heat exchanger 106. FIG. 2 illustrates an enlarged view showing the surface heat exchanger 106 arranged at an inclination on the front of the vehicle 102 forward of a front axle 112b, and extending in width between the front tires 112a. Heat exchanger 106 has a forward or first end 106a and a rearward or second end 106b. Air flow A2 passes under the front structure 102 of the vehicle 100 when the vehicle 100 is moving in a forward direction and will be directed under the vehicle 100, over heat exchanger 106 as the air flow A2 continues to pass under the length of the vehicle 100.

Figure 3A:
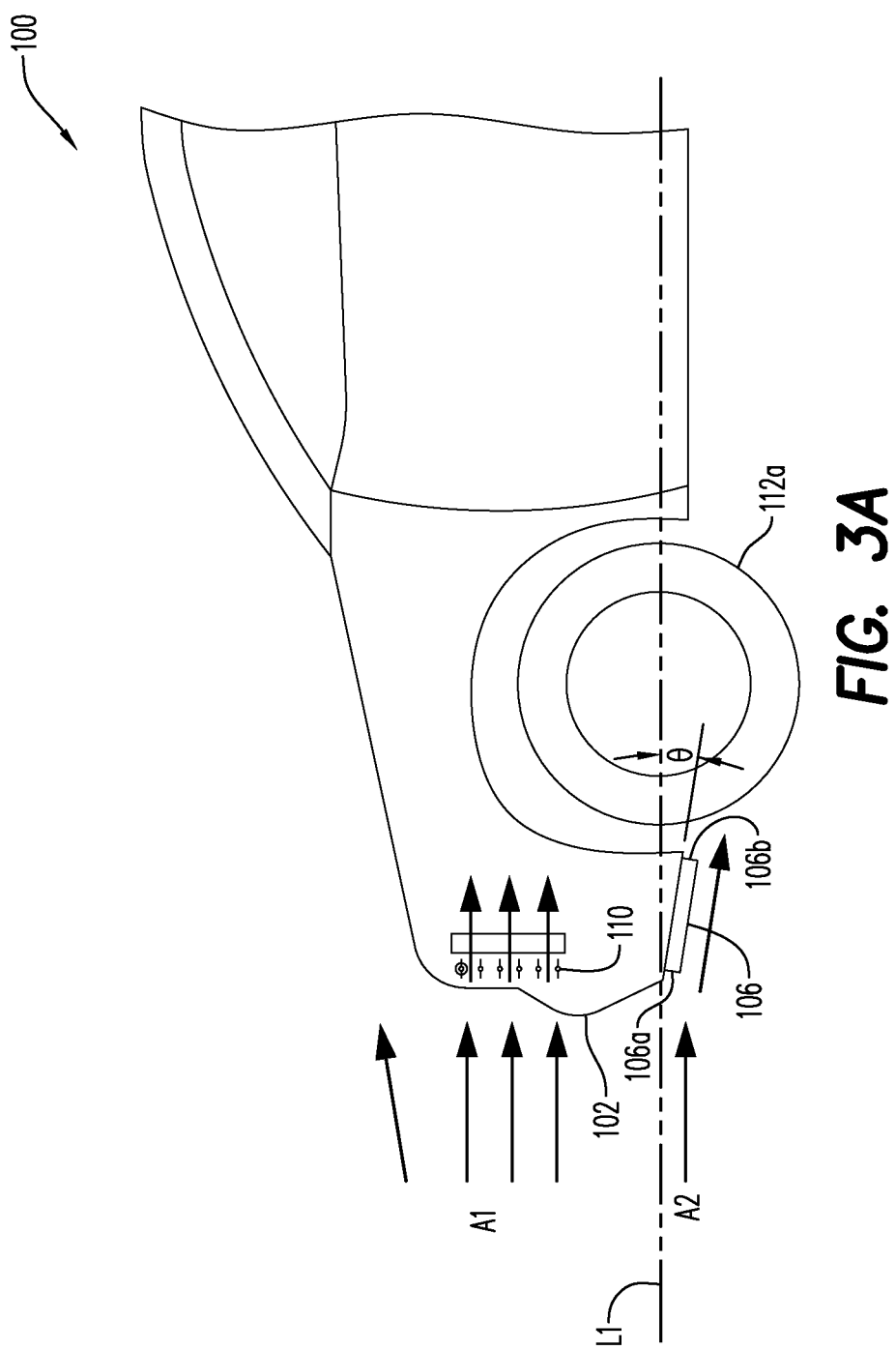
FIG. 3A is an enlarged schematic view of the surface heat exchanger positioned on the vehicle as shown in FIG. 2.

The specific location and size of the surface heat exchanger 106 are not absolute, as long as there is a sufficient volume of air flow A2 passing over the surface of the heat exchanger 106 in a generally parallel manner to achieve the required heat transfer, i.e., heating or cooling. In accordance with the exemplary embodiment, when the surface heat exchanger 106 is disposed on the front underside of the vehicle 100 (i.e., forward of a front axle 112b between front wheel wells 112c), the surface heat exchanger 106 is also disposed at an angle relative to a longitudinal axis of the vehicle 100. That is, as shown in FIG. 3A, an imaginary line L1 is shown extending parallel to the longitudinal axis of the vehicle 100 and intersecting the forward end 106a of the heat exchanger 106. The second end 106b of the heat exchanger is disposed at an angle θ relative to line L1. In the exemplary embodiment, the vehicle 100 has a predetermined height extending from the ground surface upwards to the roof of the vehicle. Hence, due to the angle of inclination at which the heat exchanger 106 is disposed, the first end 106a is positioned higher on the vehicle than the second end 106b. Further, in the exemplary embodiment, the angle θ of inclination is generally greater than 0 degrees and less than 50 degrees, and optionally greater than 0 degrees and less than 20 degrees, and optionally greater than 3 degrees and less than 12 degrees.

Figure 3B:
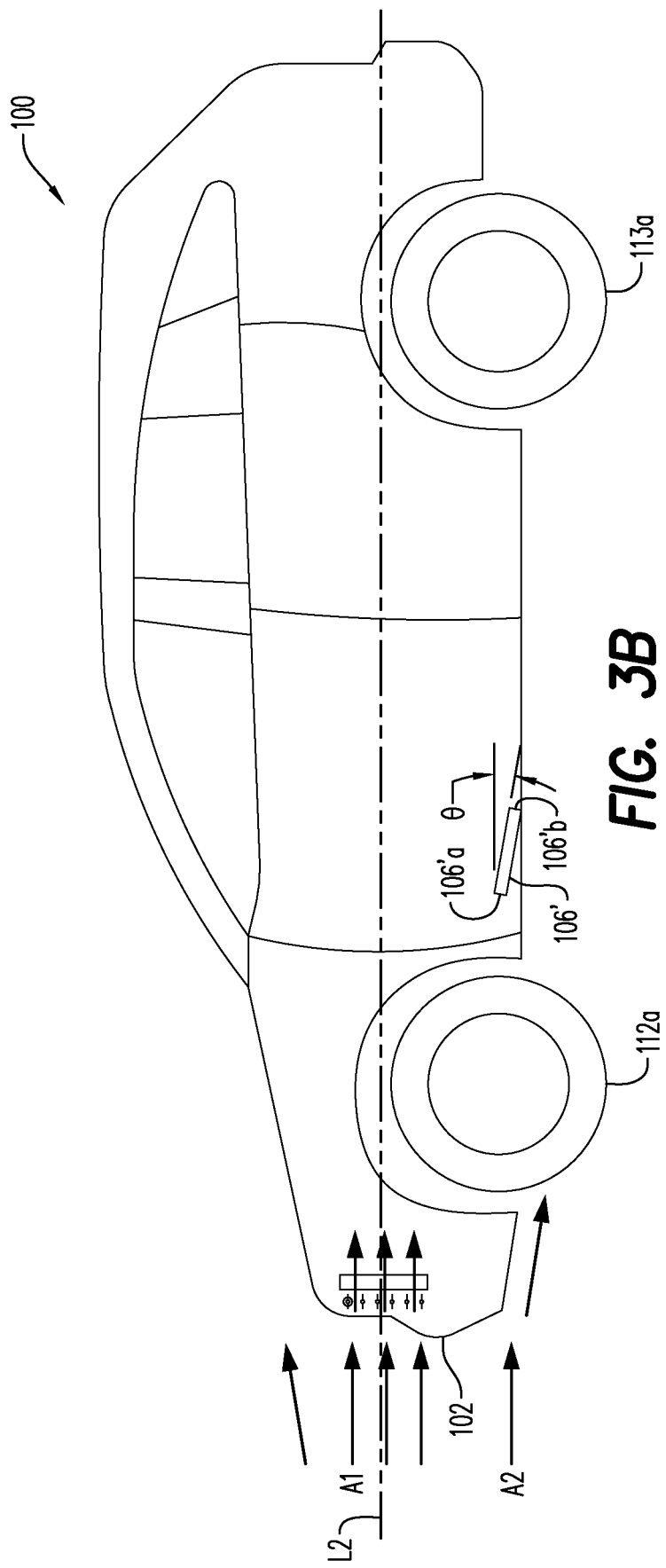
FIG. 3B is a schematic view of a surface heat exchanger positioned on the vehicle in accordance with a further exemplary embodiment of the disclosure.

As schematically shown in FIG. 3B, because the specific location and size of the surface heat exchanger are not absolute, a heat exchanger 106' could be disposed along the length of the vehicle and further rearward of the front wheel wells 112c of the vehicle 100. In this further exemplary embodiment, heat exchanger 106' is extending roughly the entire width of the vehicle (or at least the entire width of the body between the front wheel wells). When the surface heat exchanger 106' is disposed in this manner on the underbody of vehicle 100 (i.e., between front wheel wells 112c), the surface heat exchanger 106' is also disposed at angle θ relative to a longitudinal axis of the vehicle 100. That is, as shown in FIG. 3B, an imaginary line L2 is extending parallel to the longitudinal axis of the vehicle 100 and intersecting the forward end 106'a of the heat exchanger 106'. The second end 106'b of the heat exchanger is disposed at an angle θ relative to line L2. In the exemplary embodiment, the vehicle 100 has a predetermined height extending from the ground surface to the roof of the vehicle. Hence, due to the angle of inclination at which the heat exchanger 106' is disposed, the first end 106'a is positioned higher on the vehicle than the second end 106'b.

Figure 3C:
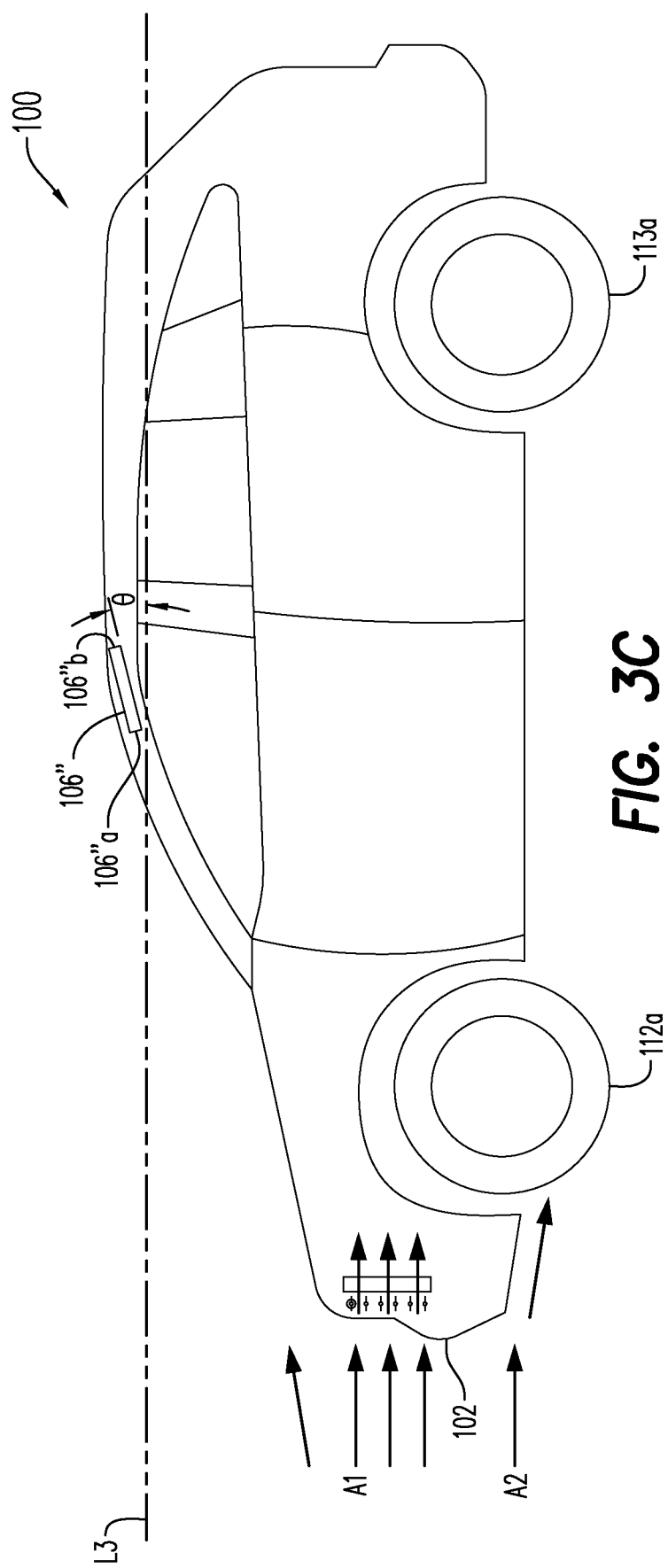
FIG. 3C is a schematic view of a surface heat exchanger positioned on the vehicle in accordance with another exemplary embodiment of the disclosure.

In a further embodiment of the disclosure, a heat exchanger 106" can be disposed along the length of the vehicle and the upper surface of the vehicle 100 as schematically shown in FIG. 3C. In this further exemplary embodiment, the surface heat exchanger 106" is also disposed at angle θ relative to a longitudinal axis of the vehicle 100. That is, as shown in FIG. 3C, an imaginary line L3 is extending parallel to the longitudinal axis of the vehicle 100 and intersecting the forward end 106"a of the heat exchanger 106". The second end 106"b of the heat exchanger is disposed at an angle θ relative to line L3. In this further exemplary embodiment, with the heat exchanger 106" disposed along the upper surface or roof line of the vehicle, the first end 106"a is positioned lower on the vehicle than the second end 106"b in order to maximize the airflow over the heat exchanger 106".

Figure 3D:
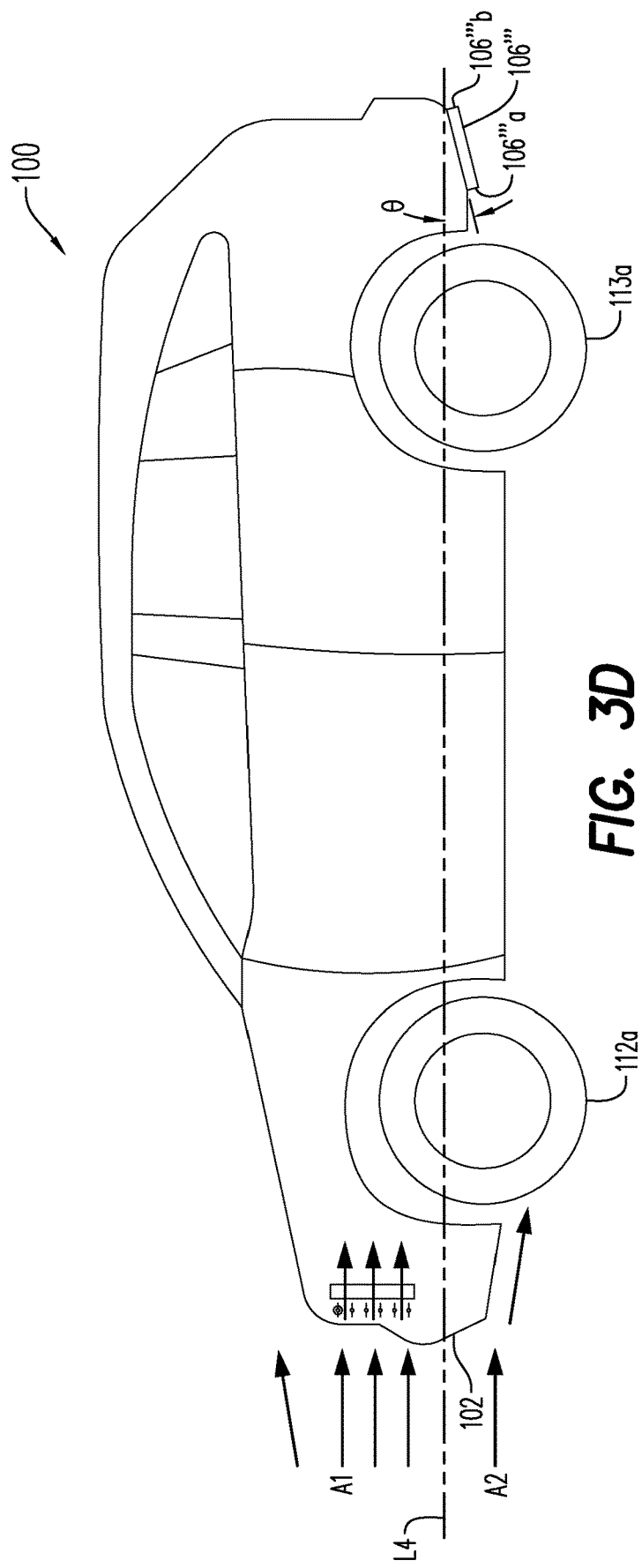
FIG. 3D is a schematic view of a surface heat exchanger positioned on the vehicle in accordance with a still further exemplary embodiment of the disclosure.
Figure 6:
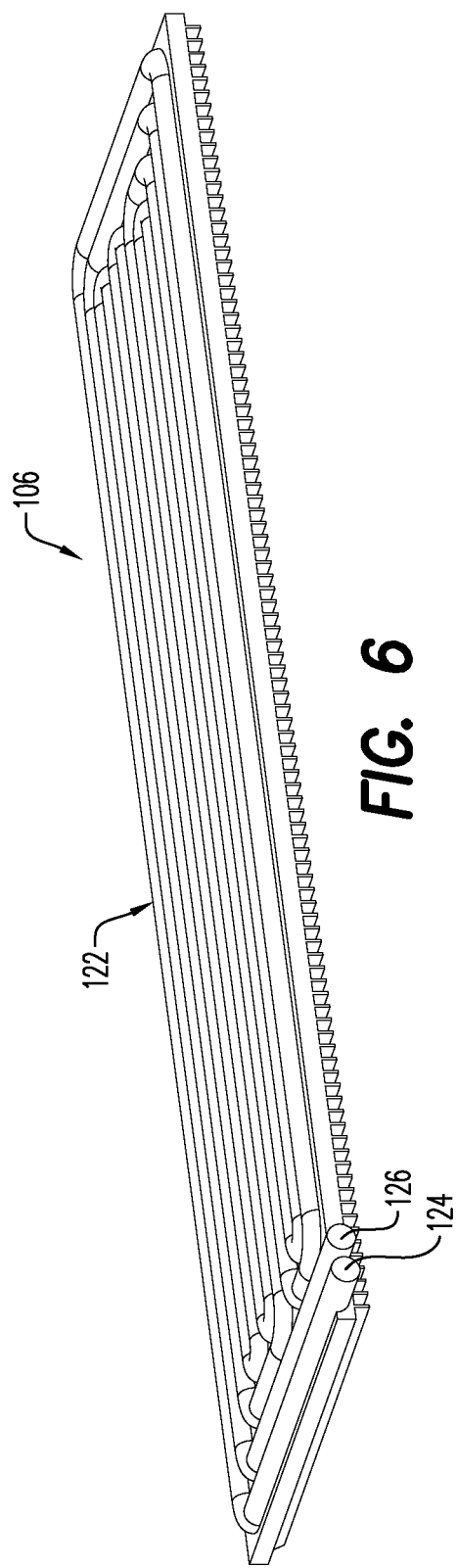
FIG. 6 is a rear perspective view of the surface heat exchanger shown in FIG. 4.
Figure 7:
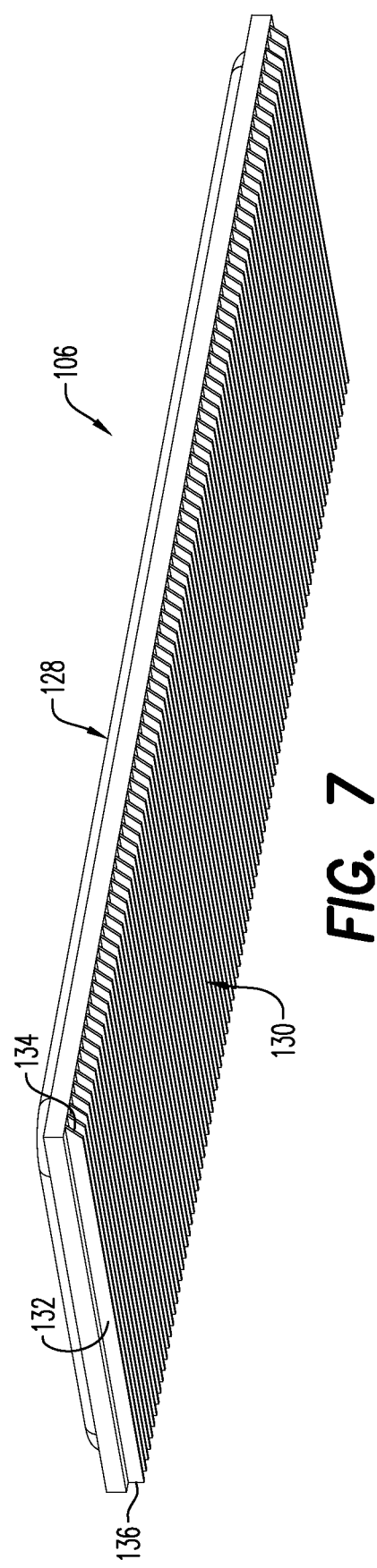
FIG. 7 is a bottom perspective view of the surface heat exchanger shown in FIG. 4.

In a still further embodiment of the disclosure, a heat exchanger 106''' can be disposed along the length of the vehicle between the rearward end of the vehicle and the rear tires 113a or rear axle 113b (see FIG. 12) of the vehicle 100, as schematically shown in FIG. 3D. When the surface heat exchanger 106''' is disposed in this manner on the underbody of vehicle 100 (i.e., between the rearward end of the vehicle and the rear tires 113a/rear axle 113b), the surface heat exchanger 106''' is also disposed at angle θ relative to a longitudinal axis of the vehicle 100. That is, as shown in FIG. 3D, an imaginary line L4 is extending parallel to the longitudinal axis of the vehicle 100 and intersecting the rearward or second end 106'''b of the heat exchanger 106'''. The forward or first end 106'''a of the heat exchanger 106''' is disposed at an angle θ relative to line L4. In the exemplary embodiment, the vehicle 100 has a predetermined height extending from the ground surface to the roof of the vehicle. Hence, due to the angle of inclination at which the heat exchanger 106''' is disposed, the first end 106'''a is positioned lower on the vehicle than the second end 106'''b.

The angle of inclination θ may vary based upon the size and location of the surface heat exchanger on the vehicle. In a non-limiting example, if the surface heat exchanger is positioned forward of the rear axle with at least a portion of the surface heat exchanger positioned along the length of the vehicle between the forward end of the vehicle and the front axle, as shown in FIGS. 3A and 3B, then the first end may be positioned higher on the vehicle than the second end. In another non-limiting example, if the surface heat exchanger is positioned rearward of the front axle with at least a portion of the surface heat exchanger positioned along the length of the vehicle between the rearward end of the vehicle and the rear axle, then the first end is positioned lower on the vehicle than the second end. However, the present disclosure is not limited to such configurations, as there may be instances where the surface heat exchanger does not meet either condition, as governed by layout considerations. It is also to be understood that the lowest point of the surface heat exchanger 106 when positioned on the vehicle underbody may be a feature, such as the fins 132 (see FIG. 4), that is different than the first or the second end 106a, 106b of the surface heat exchanger. In a similar manner, one or more fins 132 may extend from the first end 106a toward the second end 106b, and the one or more fins 132 may extend downwardly beyond the height of either or both the first end 106a and the second end 106b.

Referring also to FIGS. 4-7, an exemplary embodiment of the surface heat exchanger 106 is shown in greater detail. Heat exchanger 106 is made from aluminum in the exemplary embodiment of the disclosure, but other materials could of course also be used. Heat exchanger 106 includes an upper portion 114 partially defining one or more channels 116 and a lower portion 118 partially defining one or more channels 120. The channels 116 in the upper portion 114 and the channels 120 in the lower portion 118 together define one or more heat transfer fluid passages 122. The upper and lower portions 114, 118 may be secured together by any method including, but not limited to, brazing, welding, soldering, thermal epoxy, mechanical fasteners, or the like, to define the heat transfer fluid passages 122 for the heat transfer fluid or cooling fluid (coolant) to flow through as air passes over the lower portion 118. As shown in the illustrated embodiment, fluid passages 122 form a plurality of serpentine channels guiding the cooling fluid via an inlet 124 to an outlet 126 through the cooling fluid flow circuit (discussed in greater detail below). Alternatively, the cooling channels could also be formed by molding between two molds defining a channel half therein.

When installed on vehicle 100, an inner or interior surface 128 of the heat exchanger 106 will be facing towards the interior of the vehicle and an outer or exterior surface 130 of the heat exchanger 106 will be facing away from the vehicle 100. The outer surface 130 includes a plurality of upstanding, outwardly projecting members or fins 132 which assist in maximizing the air flow surface area over the lower portion 118 of the heat exchanger. In the exemplary embodiment, the plurality of fins 132 define straight, continuous members that are generally parallel to one another and have a predetermined spacing therebetween. Fins 132 may be cast aluminum but other materials and/or manufacturing processes such as extruding and machining could also be used. In order to further reduce the drag, the front or leading edge 134 of the fins 132 may have an angled configuration to guide the air flow A2 across the outer surface 130 in a smooth manner. As discussed above, reducing the drag, including the drag over the heat exchanger 106, thereby increases the aerodynamic performance of the vehicle 100. The rear or trailing edge 136 of the fins 132 may have a square perpendicular edge.

Figure 8A:
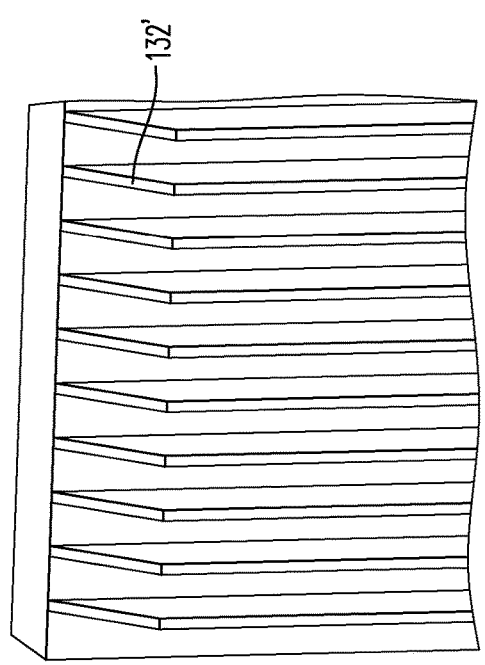
FIG. 8A is a front perspective view of a fin configuration on the surface heat exchanger according to a further exemplary embodiment of the disclosure.
Figure 8B:
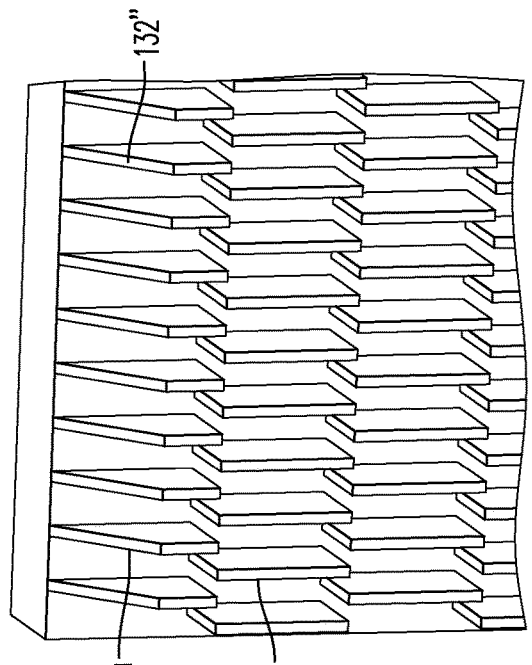
FIG. 8B is a front perspective view of a fin configuration on the surface heat exchanger according to another exemplary embodiment of the disclosure.
Figure 8C:
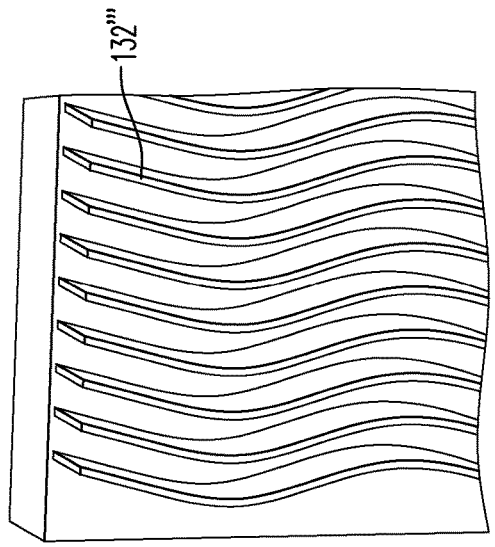
FIG. 8C is a front perspective view of a fin configuration on the surface heat exchanger according to a still further embodiment of the disclosure.

With reference to FIGS. 8A-8C, further configurations for the projecting members or fins on the surface heat exchanger are illustrated. More particularly, FIG. 8A discloses fins 132' defining straight, continuous members that are generally parallel to one another and have a predetermined spacing therebetween. The spacing for fins 132' is less than that for the exemplary embodiment of fins 132 such that a double density of fins is obtained on the heat exchanger. FIG. 8B discloses fins 132" that include a first portion 133a and a second portion 133b that are offset from one another. Hence, rather than fins 132" having continuous members, the fins 132" are defined by a plurality of disconnected sections 133a, 133b. In an alternative configuration shown in FIG. 8C, fins 132''' are defined by continuous members that are generally parallel to one another and have a predetermined spacing therebetween, but the members each have a wavy configuration extending along the surface heat exchanger.

Figure 9A:
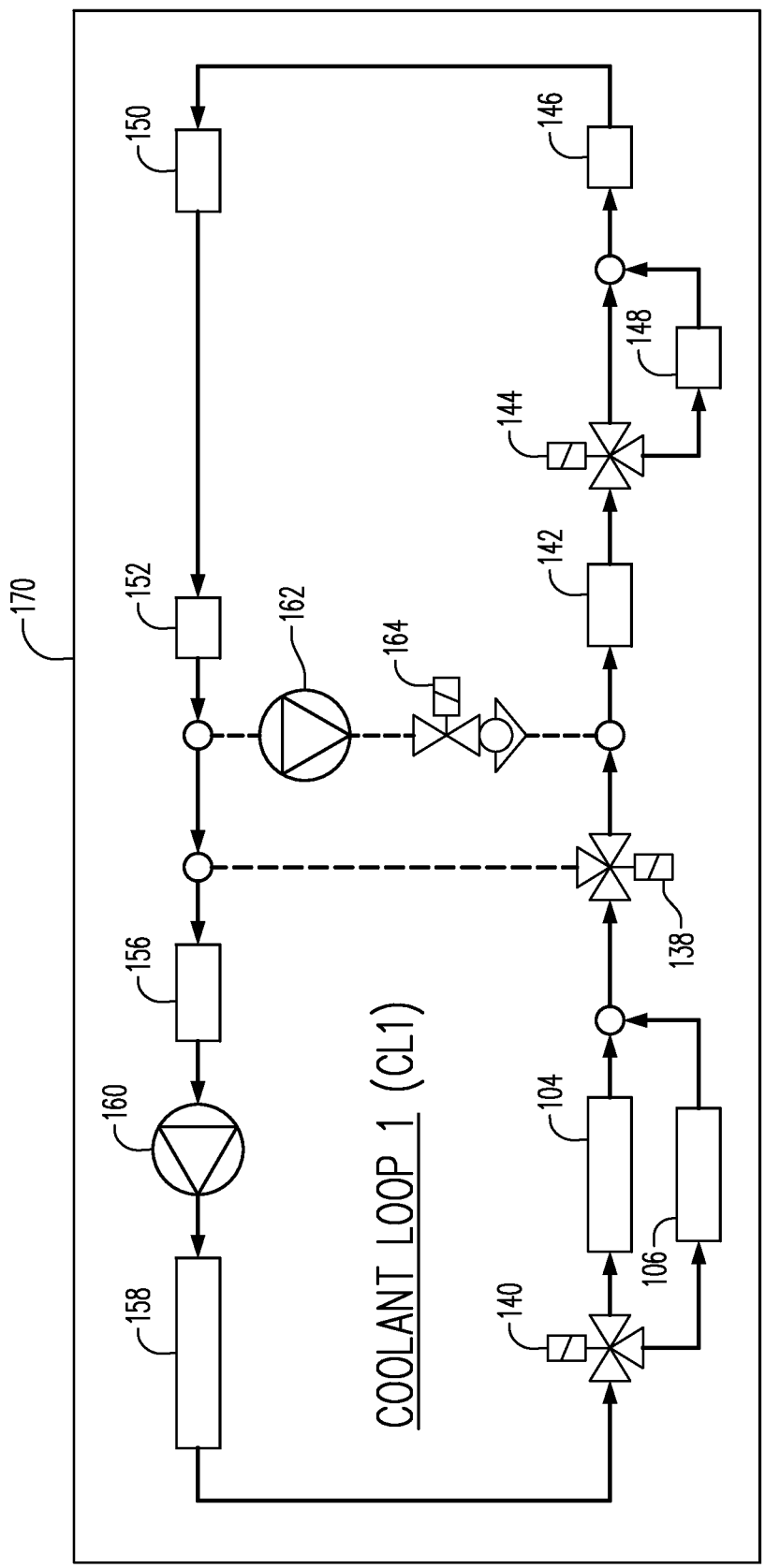
FIG. 9A is a heat transfer system flow diagram according to a first exemplary embodiment of the disclosure in one mode of operation.
Figure 9B:
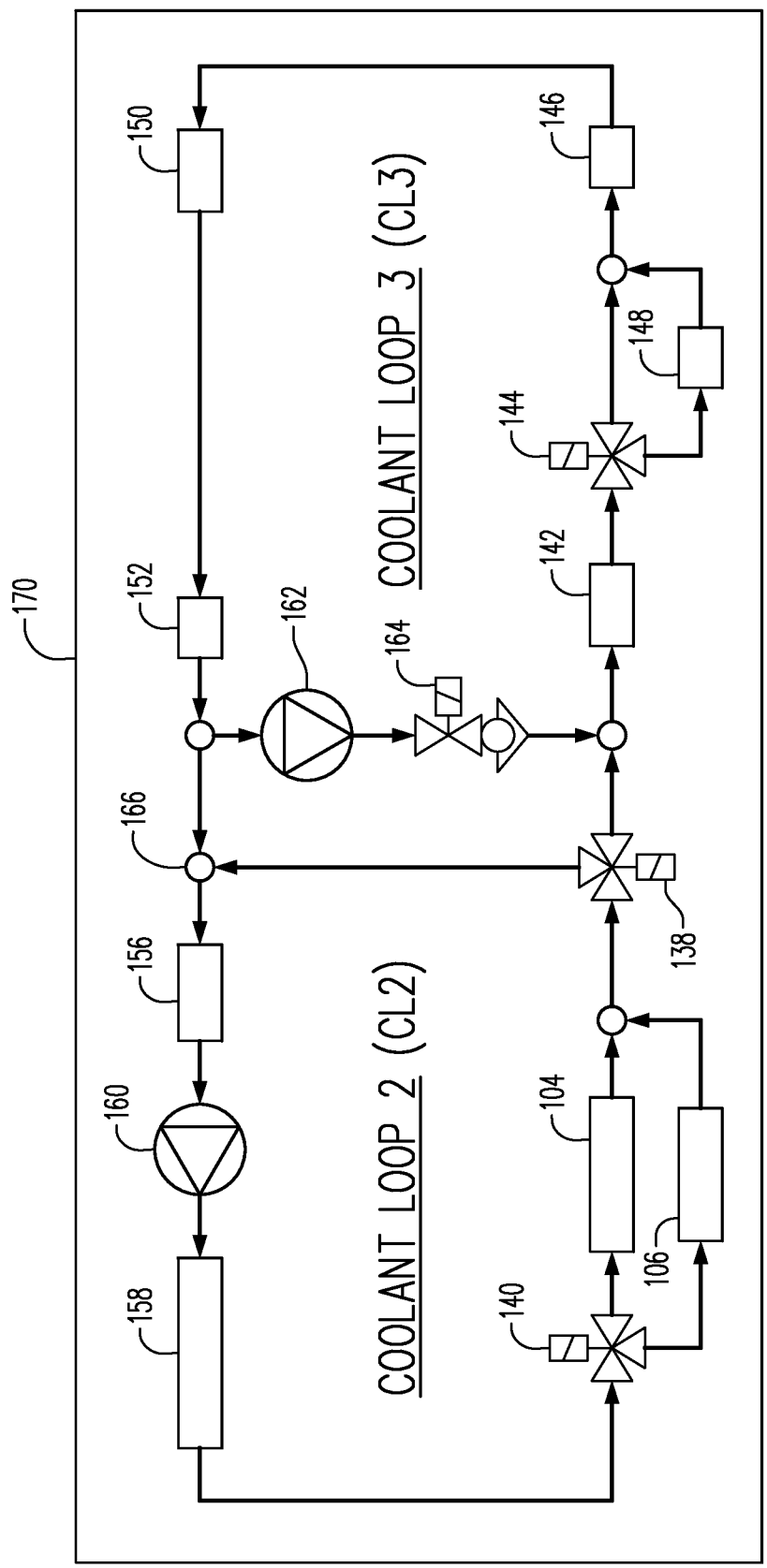
FIG. 9B is a heat transfer system flow diagram according to a first exemplary embodiment of the disclosure in another mode of operation.

With reference to FIGS. 9A-9B, a controller 170 is operable in at least a first mode to selectively transfer heat with at least a first vehicle component with coolant flow through one or both of the heat exchanger 104 and the surface heat exchanger 106, based on one or more operating conditions affecting the heat transfer system. More particularly, under certain operating conditions, as discussed below, airflow A2 passing over the surface of surface heat exchanger 106 may by itself provide a sufficient cooling (heat transfer) effect for selected components of the vehicle 100, thus obviating the necessity of having airflow A1 going through the first heat exchanger 104. Accordingly, utilization of the second heat exchanger 106 rather than the first heat exchanger 104 reduces the aerodynamic drag caused by the passage of airflow A1 through first heat exchanger 104 and can thus increase the overall performance of the vehicle 100.

The heat transfer system (e.g., heat exchangers 104, 106, heat transfer fluid flow circuit and associated valves) may be used for cooling or heating one or more components of the vehicle 100, such as, for example, one or more batteries, electric motors, and/or inverters. In one implementation, one or more of the components exchange heat with a cooling fluid (heat transfer fluid) in the flow circuit, which transports the cooling fluid back to one or both of the heat exchangers 104, 106 of the heat transfer system. In the heat transfer system, the cooling fluid flowing through one or both of the heat exchangers 104, 106 is again at least partly cooled by airflow generated by the forward movement of the vehicle 100. Hence, the heat transfer system defines a closed loop fluid path during system operation as it can exchange energy (as heat or work) with its surroundings, but not matter.

FIG. 9A and 9B illustrate an exemplary embodiment of a heat transfer fluid flow circuit according to a first embodiment of the disclosure herein. More particularly, when a valve 138 is configured in a first manner, FIG. 9A shows that the cooling fluid is permitted to flow about the perimeter of a fluid flow circuit to define a first coolant loop CL1. In FIG. 9B, valve 138 is configured such that the flow circuit forms two circulating flow loops, that is, a second coolant loop CL2 and a third coolant loop CL3. In both the configuration of FIG. 9A and that of FIG. 9B, the valve 140, such an electric fluid valve, can be configured to direct the cooling fluid either through only the first, flow through heat exchanger 104 (thereby bypassing the surface heat exchanger 106), through only the surface heat exchanger 106, or through both the flow through heat exchanger 104 and the surface heat exchanger 106. The selection between these alternative heat exchanger flow paths is controlled by a thermal management system based upon a number of operating conditions, as discussed below.

In a first exemplary mode of operation, valve 138, such as an electric fluid valve, is open for flow therethrough and the heat transfer (working) fluid flows along the first coolant loop CL1 shown in FIG. 9A.

In the first mode of operation with cooling fluid flowing through the flow through heat exchanger 104, the shutters 110 are open so as allow airflow A1 to pass through heat exchanger 104. The valve 140, such an electric fluid valve, can be configured to direct the cooling fluid through only the first, flow through heat exchanger 104 (thereby bypassing the surface heat exchanger 106). One driving condition that may require the use of only the flow through heat exchanger is when the ground or road surface is extremely hot and the surface of the surface heat exchanger 106 might be so warm that it would actually transfer heat in to the system instead of cooling the same. In such instance, it is desirable to bypass the surface heat exchanger 106. The cooling fluid passes straight through valve 138 and optionally through a chiller 142 (heat exchanger with air conditioner) which may not be operational, and through valve 144, such as a further electric fluid valve. Valve 144 either directs the cooling fluid directly to a cooling fluid jacket (not shown) for a high voltage battery 146 or is configured to direct the cooling fluid through an electric coolant heater 148 prior to flowing towards the cooling fluid jacket for the battery 146. The cooling fluid will be directed to pass through the electric coolant heater 148 when the battery is too cold. Further components may be provided in the cooling fluid circuit along the first coolant loop CL1, such as for example, a rectifier 150 and charger 152, as well as an expansion tank 156 and power control unit/motor(s) 158, such as a twin motor unit in the exemplary embodiment. Pumps 160, 162 may also be provided, such as electric fluid pumps for example, to assist with flow of internal working fluid such as a coolant or a refrigerant to the motor(s) 158 and battery 146, respectively. A flow shut-off valve 164 is also provided and remains closed during operation in the first mode of operation, thereby ensuring the cooling fluid flows in the first coolant loop CL1 around the perimeter of the fluid flow diagram shown in FIG. 9A.

A second exemplary mode of operation is similar to the first exemplary mode of operation described above in that the valve 138 is open and the cooling fluid flows along the first coolant loop CL1 shown in FIG. 9A. Unlike the first mode of operation, however, the valve 140 is configured to direct the cooling fluid through the surface heat exchanger 106 rather than the flow through heat exchanger 104. In the second mode of operation with the cooling fluid passing through only surface heat exchanger 106, the shutters 110 are closed so as to prevent airflow A1 from passing through heat exchanger 104. Air is directed under the vehicle in the pattern of airflow A2. The cooling fluid passes straight through valve 138 and through a chiller 142, i.e., heat exchanger with air conditioner condenser, and through valve 144, such as a further electric fluid valve. In the second mode of operation, the cooling fluid passes through the chiller 142 but the chiller is not activated at the time. Valve 144 either directs the cooling fluid directly to a cooling fluid jacket (not shown) for the high voltage battery 146 or is configured to direct the cooling fluid through an electric coolant heater 148 prior to flowing towards the water jacket for the battery 146. The cooling fluid will be directed to pass through the electric coolant heater 148 when the battery is too cold. Further components that may be provided in the cooling fluid circuit along the first coolant loop CL1 include a rectifier 150 and charger 152, as well as an expansion tank 156 and power control unit/motor(s) 158, such as a twin motor unit in the exemplary embodiment. Pumps 160, 162 may also be provided, such as electric fluid pumps for example, to assist with flow of internal working fluid such as coolant or a refrigerant to the motor(s) 158 and battery 146, respectively. A flow shut-off valve 164 is also provided and remains closed during operation in the second mode of operation, thereby ensuring the cooling fluid flows in the first coolant loop CL1 around the perimeter of the fluid flow diagram of FIG. 9A.

In a non-limiting example, the second mode of operation described above is aerodynamically efficient because it utilizes only the surface heat exchanger 106 and not the flow through heat exchanger 104. By closing off airflow to the flow through heat exchanger 104, and hence airflow through the shutters 110, the overall efficiency and aerodynamic performance of the vehicle 100 is improved. However, the second mode of operation using the surface heat exchanger 106 is primarily used only under certain operating conditions, such as, for example, low thermal load conditions that require low heat transfer capacity such as driving downhill or on a flat surface, low to moderate ambient air conditions, and when a vehicle is not towing a trailer, boat, or any other article.

Rather than alternating between use of the flow through heat exchanger 104 and the surface heat exchanger 106 as described above, the controller 170 can also direct the heat transfer fluid to flow through both the flow through heat exchanger 104 and the surface heat exchanger 106 at the same time if needed to obtain the required heat transfer capacity. More particularly, if the heat transfer capacity of the surface heat exchanger 106 is determined to be a first value that exceeds a first predefined limit, then the selected vehicle component is cooled with only the surface heat exchanger 106. However, if the heat transfer capacity of the surface heat exchanger 106 is determined to be a second value that is less than the first predefined limit, then the selected vehicle component is cooled with the surface heat exchanger 106 and the flow through heat exchanger 104 acting together. More particularly, by way of example and not limitation, if the heat transfer capacity (cooling performance) of the surface heat exchanger 106 while the vehicle is travelling at a certain speed (for example, at a constant high speed of 70-130 kph), is greater than the heat generation of the selected vehicle component(s) at the same speeds for a battery-type electric vehicle (i.e., the first predefined limit), then only the surface heat exchanger 106 is used since the surface heat exchanger 106 alone is able to sufficiently transfer more than enough heat to cool the selected vehicle component(s) under these operating conditions. That is, the surface heat exchanger 106 is able to transfer more heat than the heat generated by the vehicle components during this constant high speed portion of the driving cycle. Hence, the surface heat exchanger 106 can maintain the vehicle components at acceptable operating temperatures during predetermined operating conditions. On the other hand, if the heat transfer capacity of the surface heat exchanger 106 while the vehicle is travelling at a certain speed or at certain operating conditions is less than the heat generation of the selected vehicle component(s) at the same speeds and conditions for a vehicle such as, but not limited to, a battery-type electric vehicle (i.e., the first predefined limit), then the surface heat exchanger 106 and the flow through heat exchanger 104 are both utilized in order to provide sufficient heat transfer to cool the selected vehicle component(s) under the given operating conditions. The surface heat exchanger 106 and the flow through heat exchanger 104 thus form a two-tier heat transfer system for the vehicle, as described in detail above.

The operation of valve 140 to alternate between use of the flow through heat exchanger 104 and the surface heat exchanger 106, or to use both heat exchangers 104, 106, is determined by a thermal management control system (controller 170) based upon operating conditions affecting the heat transfer system, the speed of the vehicle 100 and the temperature of various vehicle components, such as, by way of example, the battery 146, power control unit and motor(s) 158, rectifier 150 and charger 152. Thus, the thermal management control system is also in communication with temperature sensors disposed on the various vehicle components or in the cooling fluid flow circuit near the components in order to determine whether heat exchanger 104 or heat exchanger 106, or both, will be active.

In addition to the first and second modes of operation utilizing the first coolant loop CL1 shown in FIG. 9A, there are times when heat exchanger cooling alone is not sufficient to protect the battery 146 from the risk of extreme heat. When such a time is encountered, the valves are adjusted such that cooling fluid flows through both a second coolant loop CL2 and a third coolant loop CL3, concurrently, as illustrated in FIG. 9B. This represents a third mode of operation according to the first exemplary embodiment of the disclosure.

When operating in the third mode of operation, valve 138 directs the cooling fluid passing therethrough upwards to node 166 shown in FIG. 9B. The cooling fluid flows in the second coolant loop CL2 through components such as the expansion tank 156 and motors/power control unit 158 which do not require as much cooling as the battery 146. The cooling fluid will circulate through either first heat exchanger 104, surface heat exchanger 106, or both, based upon the factors considered by the thermal management system as discussed above.

Also while operating in the third mode of operation, the cooling fluid flows in the third coolant loop CL3, which includes the high voltage battery 146 and other components, such as the rectifier 150 and charger 152. When operating in the third mode of operation, the flow shut valve 164 will open to allow the cooling fluid to circulate in the third coolant loop CL3. In the third mode of operation, the chiller 142 will be active in order to more quickly cool the cooling fluid and thus provide immediate cooling for the battery 146. The chiller 142 is very effective for rapid cooling of the battery 146 because it uses energy from the air conditioner condenser (not shown) to cool the cooling fluid passing therethrough. However, because of the condenser usage, the chiller is not an efficient use of energy and it is desirable to minimize the use thereof. Minimization of the use of the chiller 142 is achieved by the thermal management control system operating the heat transfer system through the first coolant loop CL1 and determining an optimum temperature at which to change operation from the first heat exchanger 104 to the surface heat exchanger 106.

Figure 10:
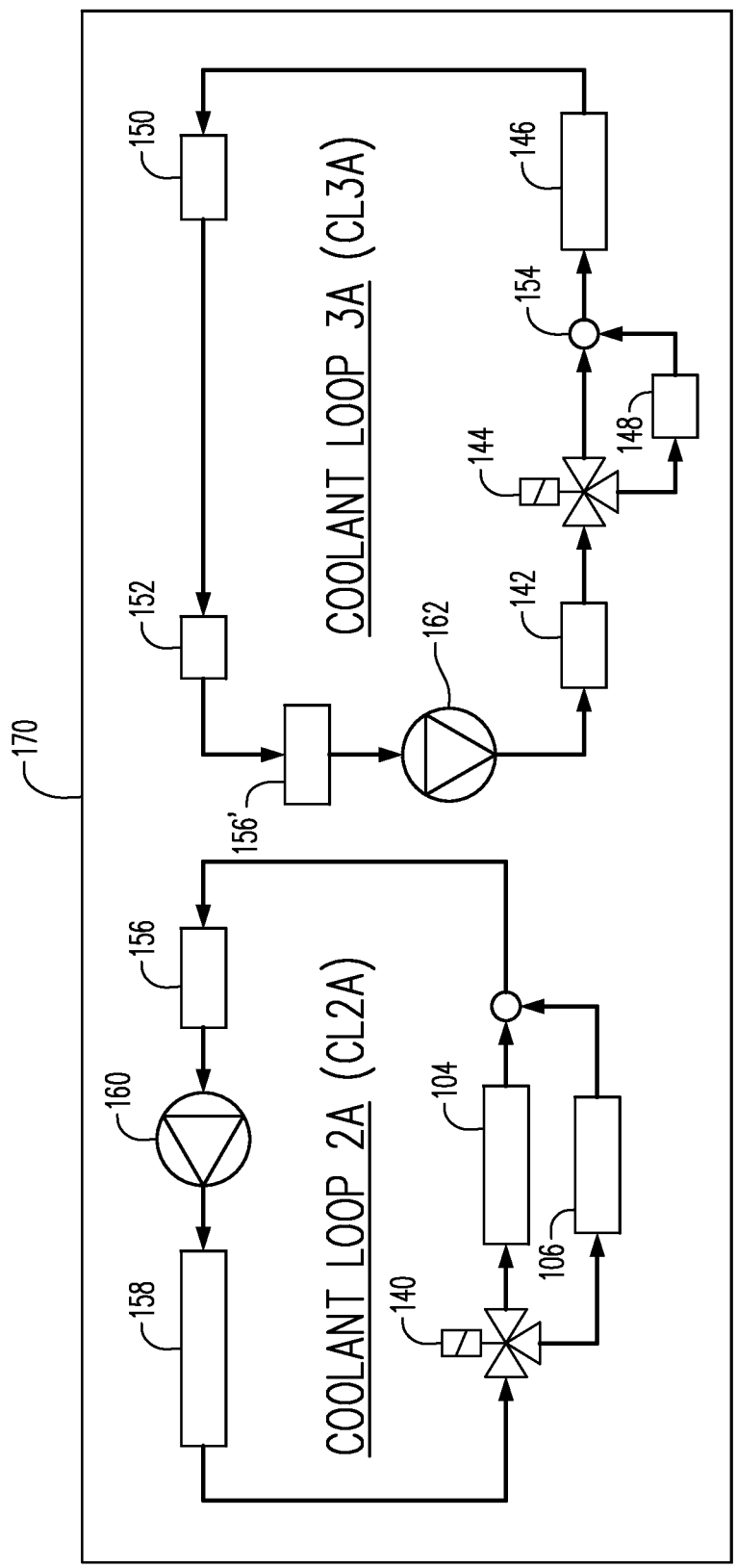
FIG. 10 is a heat transfer system flow diagram according to a second exemplary embodiment of the disclosure.

Referring to FIG. 10, an exemplary embodiment of a cooling fluid flow circuit according to a second embodiment of the disclosure is shown, with like components using like numbers from the first embodiment described above. Depending upon the temperature requirement of a battery, if the battery 146' is more susceptible to high temperatures and requires more cooling, the chiller 142 is optionally used in normal operation to maintain the temperature of the battery 146'. In this instance, two separate and independent loops are used, such as cooling loop CL2A and cooling loop CL3A, as shown in FIG. 10. The cooling loop CL2A functions substantially similar to the second cooling loop CL2 described above in that heat exchangers 104, 106 are used to cool only certain components of the vehicle, and not the high voltage battery 146'. The valve 140 would switch the cooling fluid flow based upon the operating conditions sensed by the thermal management system. Coolant loop CL3A would circulate the cooling fluid in a separate loop so as to maintain the battery 146' at the desired temperature through use of the chiller 142 and/or the electric coolant heater 148. A further reservoir or expansion tank 156' is also provided since coolant loop CL3A and coolant loop CL2A are not in fluid communication. The second exemplary embodiment of the disclosure thus operates similar to the third mode of operation of the first exemplary embodiment of the disclosure (FIG. 9B).

Figure 11:
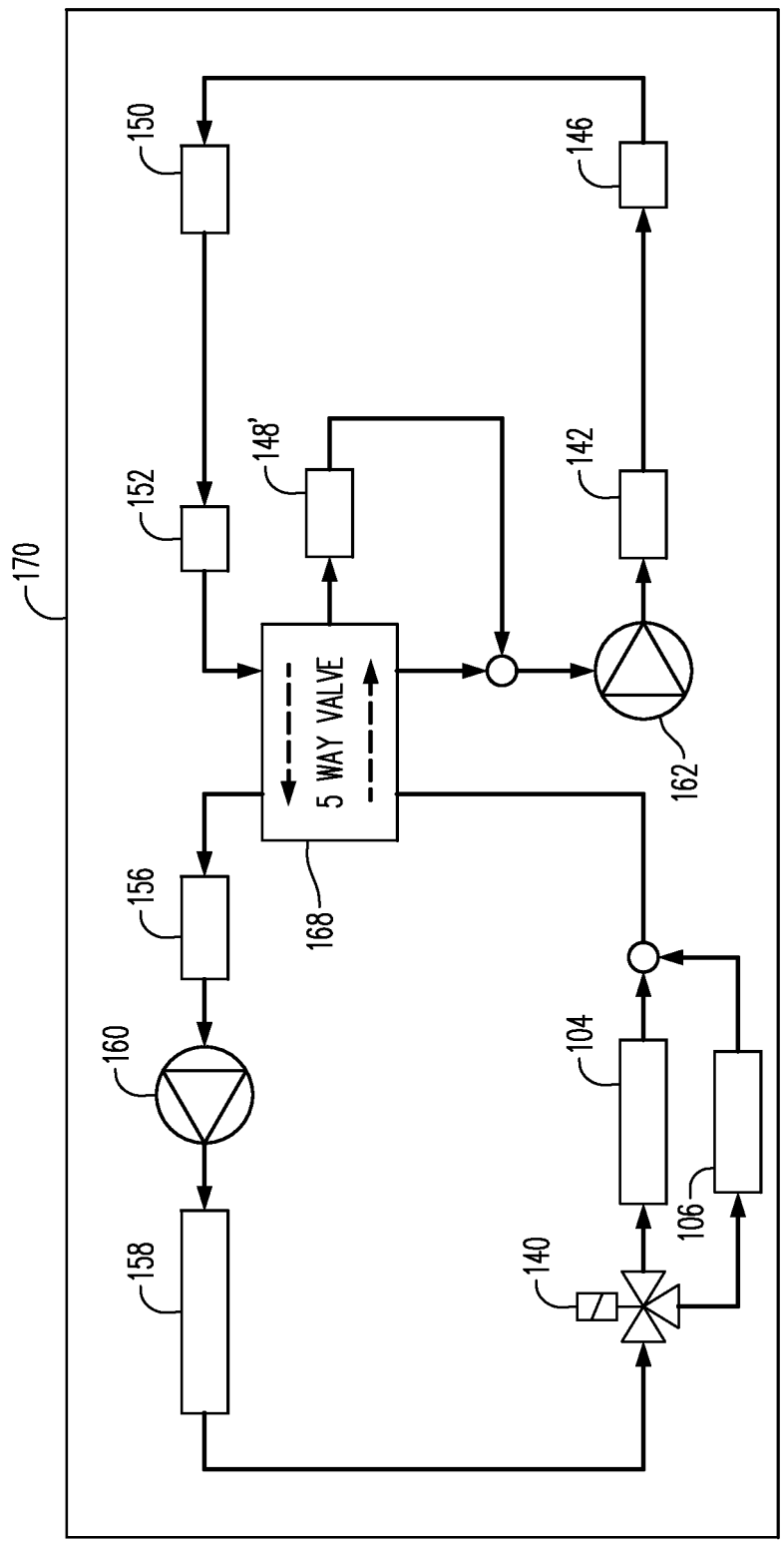
FIG. 11 is a heat transfer system flow diagram according to a third exemplary embodiment of the disclosure.

A third exemplary embodiment of the disclosure is shown in FIG. 11, with like components having like numbers from the first exemplary embodiment described above. The third exemplary embodiment of the disclosure operates similar to the first exemplary embodiment shown in FIGS. 9A and 9B. The third exemplary embodiment differs primarily in that a 5-way valve 168 is provided rather than the valve 138 and flow shut valve 164 in the first embodiment. The 5-way valve 168 is able to control the circulation of the cooling fluid through either a first cooling loop encompassing all of the components to be cooled, or simultaneously through second and third cooling loops whereby the second cooling loop utilizes one of the heat exchangers to cool the motors/power control unit 158 and the third cooling loop utilizes the chiller 142 to cool the high voltage battery 146. The first, second, and third cooling loops are similar to those discussed above relative to the first exemplary embodiment of the disclosure and a detailed discussion is therefore omitted here.

In addition to the cooling performance discussed above, and in the same manner as discussed above, the heat transfer system of the disclosure herein can also be utilized to heat selected vehicle component(s) using either or both of the flow through heat exchanger 104 and the surface heat exchanger 106 if required based on one or more operating conditions affecting the heat transfer system.

Figure 12:
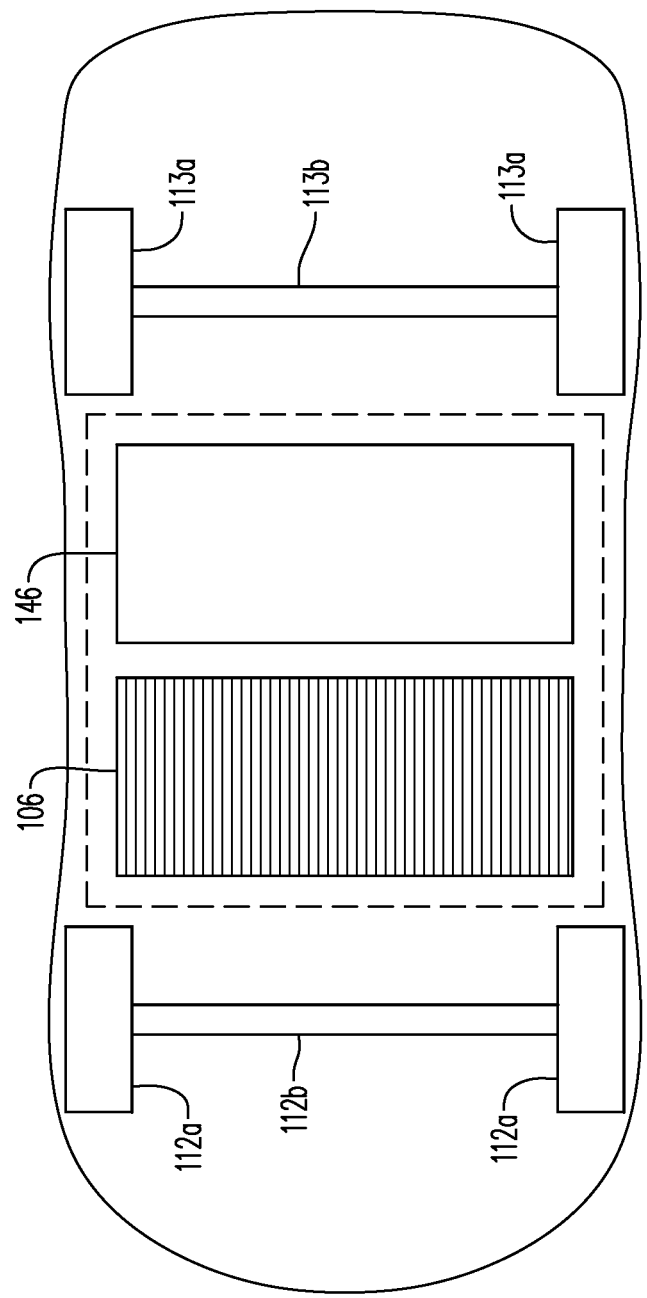
FIG. 12 is a schematic view of a surface heat exchanger positioned on the underside of a vehicle in accordance with an alternative embodiment of the disclosure.

FIG. 12 illustrates a further exemplary embodiment of the disclosure where the surface heat exchanger 106 is disposed on an underbody of the vehicle 100 between the front axle 112b and rear axle 113b. The surface heat exchanger 106 will in this instance be disposed as space permits relative to a battery pack 146. The heat exchanger 106 may be placed forward of the battery pack 146 as illustrated, but could also be disposed rearward of the battery pack or adjacent to the battery pack in a side-by-side relationship. Moreover, the surface heat exchanger 106 when positioned between the front axle 112b and the rear axle 113b is optionally disposed parallel to the longitudinal axis of the vehicle and the angle of inclination would thus be zero degrees, although it is to be understood that other angles of inclination are possible.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle heat transfer system comprising:
a flow through heat exchanger;
a surface heat exchanger;
at least a first vehicle component; and
a controller that is operable in at least a first mode to selectively exchange heat to or from the first vehicle component with either or both of the flow through heat exchanger and the surface heat exchanger based on one or more operating conditions.

2. The vehicle heat transfer system of claim 1, wherein, if in the first mode a heat transfer capacity of the surface heat exchanger is a first value that exceeds a first predefined limit, then at least the first vehicle component is cooled with the surface heat exchanger and, if in the first mode the heat transfer capacity of the surface heat exchanger is a second value that is less than the first predefined limit, then at least the first vehicle component is cooled with the surface heat exchanger and the flow through heat exchanger.

3. The vehicle heat transfer system of claim 2, wherein, if in the first mode a fluid flowing through the surface heat exchanger is measured or predicted to gain heat, at least the first vehicle component is cooled with only the flow through heat exchanger.

4. The vehicle heat transfer system of claim 1, further comprising an air flow control unit that is configured to selectively permit or block ambient air flow to the flow through heat exchanger based on a heat transfer capacity of the surface heat exchanger and/or an operating state of at least the first vehicle component.

5. The vehicle heat transfer system of claim 1, further comprising a fluid control valve configured to selectively direct cooling fluid to either or both of the flow through heat exchanger and the surface heat exchanger to transfer heat to or from at least the first vehicle component based on a heat transfer capacity of the surface heat exchanger and/or an operating state of at least the first vehicle component.

6. The vehicle heat transfer system of claim 1, wherein the surface heat exchanger is positioned on an underbody of the vehicle, wherein the surface heat exchanger includes a first end and a second end, wherein the second end of the surface heat exchanger is positioned rearward along a length of the vehicle relative to the first end of the surface heat exchanger, and wherein the vehicle has a height and the first end is positioned at a different height on the vehicle than the second end.

7. The vehicle heat transfer system of claim 1, wherein the controller is operable in a second mode that selectively transfers heat to or from at least the first vehicle component with one or both of the flow through heat exchanger and the surface heat exchanger based on one or more operating conditions affecting at least the first vehicle component.

8. The vehicle heat transfer system of claim 1, wherein the flow through heat exchanger is a radiator, wherein the surface heat exchanger is a radiator, and wherein the flow through heat exchanger and the surface heat exchanger are selectively operable to cool at least the first vehicle component.

* * * * *